United States Patent [19]
Yashiro et al.

[11] 4,408,345
[45] Oct. 4, 1983

[54] REMOTE LINE MONITORING METHOD AND DEVICE FOR CATV SYSTEM

[75] Inventors: Kenji Yashiro; Toshio Tabata, both of Tokyo, Japan

[73] Assignee: Pioneer Electronic Corporation, Tokyo, Japan

[21] Appl. No.: 160,699

[22] Filed: Jun. 18, 1980

[30] Foreign Application Priority Data

Jun. 21, 1979 [JP] Japan .................. 54-78308

[51] Int. Cl.$^3$ ............................... H04B 3/46
[52] U.S. Cl. .......................... 455/3; 455/67; 358/86; 340/505; 340/825.08
[58] Field of Search ............ 455/3, 4, 5, 6, 2, 34, 455/67; 358/86, 84, 139; 340/291, 14 TA, 505, 533, 534, 626

[56] References Cited

U.S. PATENT DOCUMENTS

| | | | |
|---|---|---|---|
| 3,668,307 | 6/1972 | Face .......................... | 455/5 |
| 3,733,430 | 5/1973 | Thompson .................. | 455/2 |
| 4,025,851 | 5/1977 | Haselwood et al. ......... | 358/84 |
| 4,090,220 | 5/1978 | Gargini ....................... | 455/5 |

FOREIGN PATENT DOCUMENTS

2725250  7/1978  Fed. Rep. of Germany .......... 455/5

OTHER PUBLICATIONS

The Total Communication Concept for the Future, by Gargini, The Royal Television Society Journal, Mar.-/Apr., 1973, pp. 182-193.

*Primary Examiner*—Tommy P. Chin
*Attorney, Agent, or Firm*—Sughrue, Mion, Zinn, Macpeak and Seas

[57] ABSTRACT

A remote line monitoring device and method for a CATV system in which a center facility is connected to plural terminal units through cables of the system to transmit television signals to subscribers' homes. A plurality of monitoring terminal units are provided along various points of the interconnecting cables. Each of the monitoring terminal units is identified by an unique address. To determine conditions throughout the system, a central monitoring system transmits polling signals on the cables. If an address contained within the polling signals matches with a prestored identifying address, a monitoring terminal unit responds by transmitting data produced by monitoring converter units back to the center facility. The center facility can then display the data or produce indications identifying problems along the cables.

6 Claims, 3 Drawing Figures

REMOTE LINE MONITORING METHOD AND DEVICE FOR CATV SYSTEM

BACKGROUND OF THE INVENTION

The present invention relates to CATV systems. More particularly, the invention relates to a remote line monitoring technique for a CATV system in which a center facility can collectively monitor the conditions of lines connected between the center falicity and terminal units.

In a CATV system, typically coaxial cables are employed to connect the center facility to the terminal units. In order to satisfactorily maintain the function of the coaxial cables, gas is continuously supplied in to the cables under a pressure slightly higher than the atmospheric pressure. It is essential to monitor the gas pressure so that it is maintained at a predetermined value at all times. In addition, it is necessary to monitor whether or not the signal levels and signal amplification factors at various points along the lines are correct and whether or not the supply voltage applied to the line amplifiers is satisfactory.

In a conventional monitoring technique, several monitoring points are provided on the lines between the center facility and the terminal units. Technicians must periodically visit the monitoring points to determine the line conditions. Accordingly, the detection of abnormalities on the lines takes much time and labor.

In order to maintain the signal level constant, a technique has previously been employed in which the signal level is monitored by the provision of a pilot signal of constant level outside of the communications frequency band used for normal signal transmission in the system. The amplification factor is maintained constant by measuring the pilot signal at points where main cable amplifiers are provided. In the case where the lines of the CATV system are branched, pilot signals transmitted from the branch lines towards the center facility are collectively applied at the branching points. Therefore, in practice, it is necessary to provide different pilot signals of different but close frequency from the various lines and to separate the various pilot signals for one another for measurement thereby to monitor the conditions of the branch lines. Therefore, the above-described conventional method is disadvantageous in that a device for separating and selecting the pilot signals of different frequency is necessarily intricate in construction and high in manufacturing cost. Moreover, the line condition monitoring must be carried out through approximation measurement because the pilot signals are out of the communications frequency band.

SUMMARY OF THE INVENTION

To solve each of these problems, the invention provides a remote line monitoring technique for a CATV system in which monitoring terminal units are provided at predetermined points along the lines, the monitoring terminals are assigned with individual addresses, a central monitoring system is provided in the center facility, and at the time of polling the central monitoring system calls the monitoring terminal units to collectively monitor the conditions of the lines.

DESCRIPTION OF THE PREFERRED EMBODIMENTS

Figure 1:
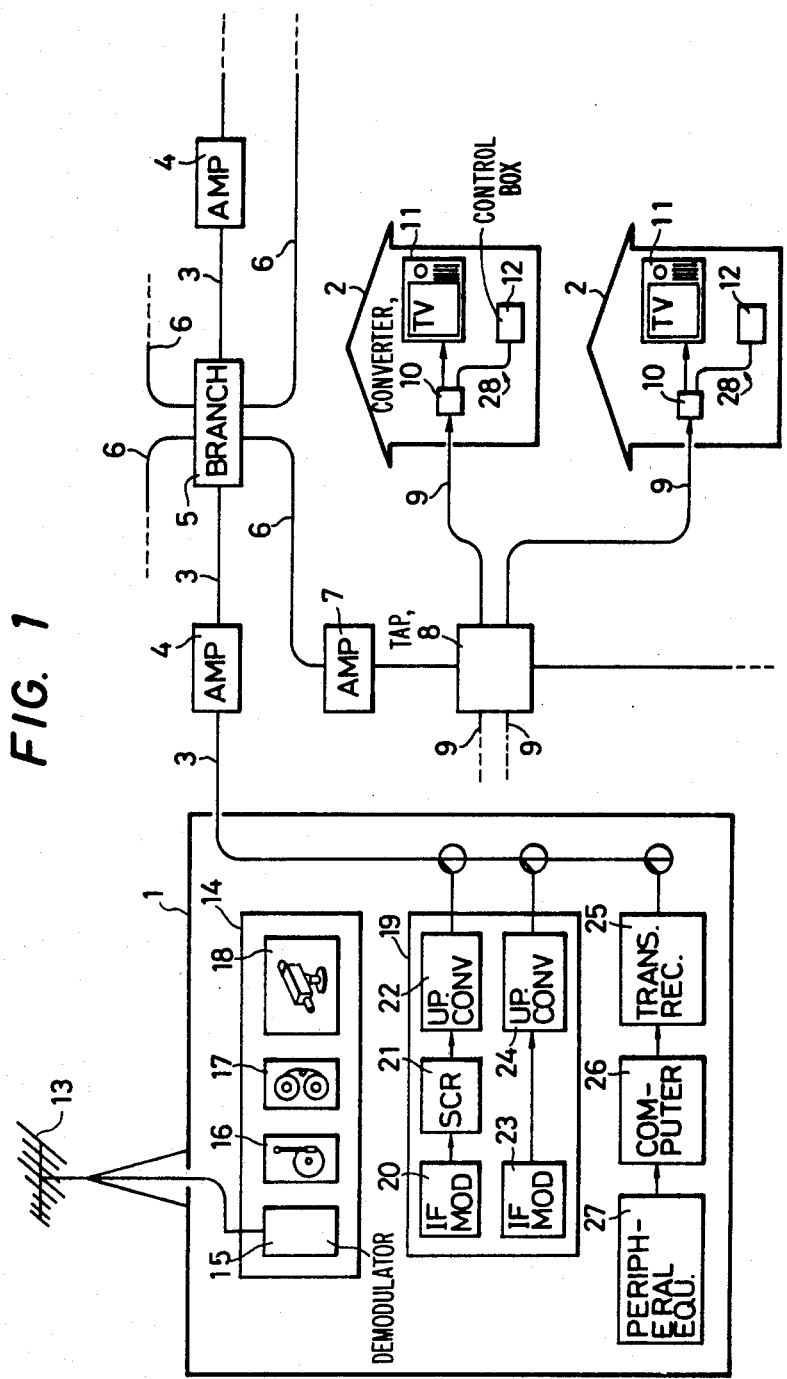
FIG. 1 is an explanatory diagram showing a typical example of a CATV system.

A typical example of a CATV system in which the invention can be used to advantage will be described with reference to FIG. 1. In this system, terminal units 28 are provided, for instance, in tens of thousands of subscriber's homes 2 for a single center facility 1. The center 1 and the terminal units 28 form one set or group. The center 1 is connected through coaxial cables to the terminal units 28 in the homes 2. A main cable 3 extends from the center 1. Main cable amplifiers 4 and branching units 5 are provided along the main cable 3 at predetermined points. Plural branch cables 6 extend from each branching unit 5. Extension cable amplifiers 7 and taps 8 are provided along each branch cable 6 at predetermined positions. Plural auxiliary branch cables 9 extend from each tap 8 with auxiliary branch cables 9 leading into the homes 2. Provided in each home 2 is a terminal unit 28 including a converter 10, a television set 11 and a control box 12. The end of the auxiliary branch cable 9 is connected to the converter 10 which is in turn connected to the television set 11 and the control box 12. In this fashion, the main cable from the center 1 spreads branches repeatedly connecting the center 1 to the terminal units in the homes 2.

A signal receiving antenna 13 is installed outside the center 1. The antenna 13 is connected to a demodulator 15 in a source group 14. The source group 14 includes a video disc player 16, a video tape recorder 17, a studio 18 and other such equipment as desired. Signals from the source group 14 are applied to a modulation and transmission section 19. The section 19 includes two systems. One of the two systems includes an IF modulation circuit 20, a scrambling circuit 21, and an up-converter circuit 22 while the other includes an IF modulation circuit 23 and an up-converter 24. The outputs of the up-converter circuits 22 and 24 are connected to the main cable 3. The main cable 3 is connected to a transmitter-receiver 25 which communicates with the converters 10. The transmitter-receiver 25 is connected to a computer 26 which is connected to peripheral equipment 27 such as a printer and a display unit.

The operation of the CATV system thus constructed will now be described. First, the switch of the television set is turned on and the television set is set to a predetermined designated channel which is preferably not used by local over-the-air stations. The control box 12 is then operated so that the frequency of a desired channel to be received is converted into that of the designated channel by the converter 10. The channels which can be selected by the control box can be classified into a group A of channels of which television signals are received over the air and retransmitted without modification, a group B of channels of independent programs provided free of charge, and a group C of channels of chargeable programs. Each group has several corresponding channels. Typically, selection can be made from about twenty or thirty channels.

For the group A, a television signal received by the signal receiving antenna is demodulated by the demodulator 15 and then applied to the modulation and transmission section 19. The signal is modulated by the IF modulation circuit 23. The frequency of the signal thus modulated is increased to a predetermined value by the up-converter circuit 24. Thus, the television signal received is changed into a signal upon a desired channel, which is then transmitted through the main cable 3, the branch cables 6 and the auxiliary branch cables 9 to the television sets 11.

The independent programs of group B are for instance weather forecast programs and news programs. A television signal provided by the video disc player 16 or the video tape recorder 17 or a television signal from a live program produced in the studio 18 is modulated and frequency-multiplied by the IF modulation circuit 23 and the up-converter circuit 24 into a television signal upon the desired channel which is applied to the main cable 3. The independent programs are free of charge irrespective of the number of times of television signal reception or the period of time of television signal reception. Each subscriber can receive the television signals for a basic monthly charge.

The chargeable programs of group C are typically new movie programs, special programs, or the like. A television signal provided by the video disc player 16 or the video tape recorder 17, or a television signal from a live program produced in the studio 18 is modulated by the IF modulation circuit 20. A scrambling synchronizing signal of predetermined form is added to the video signal in the television signal by the scrambling circuit 21. Because of this signal, if the television signal is received only as it is by the television set, it is impossible to reproduce normal pictures on the television set. The television signal thus treated is applied to the up-converter 22 where its frequency is increased to the frequency of a designated channel. The television signal thus processed is supplied to the main cables 3.

Upon receiving the television signal of the chargeable program by the television set in each home 2, the scrambled television signal is converted into a normal video signal by the converter 10 so that normal pictures can be observed on the television set 11. Whenever a chargeable program is received, a predetermined fee is charged to the subscriber. The sum of the monthly basic charge and the special use fee is billed to the subscriber.

In order to determine whether received programs are free of charge or not, it is necessary to detect what subscribers have used what channels for particular periods of time. For this purpose, the transmitter-receiver 25 outputs a retrieving signal at predetermined time intervals to address the converter 10 in each terminal unit with an address number assigned to that particular terminal unit to determine if a group C channel is being used at the retrieval time. In response to this, the converter 10 sends to the transmitter-receiver 25 an answering signal representative of the channel which is in use at the retrieval time. The charge data transmitted and received by the transmitter-receiver 25 is arranged and stored by the computer 26 and displayed or printed out by the peripheral equipment 27. As the retrieving signal is transmitted at fixed predetermined time intervals of typically several seconds to several tens of seconds, audience ratings can also be immediately calculated.

A subscriber can choose which programs he wishes to view by operating his control box 12 while watching the television set 11. The subscriber's choice or answer is encoded and sent through the coaxial cables to the center 1.

Figure 2:
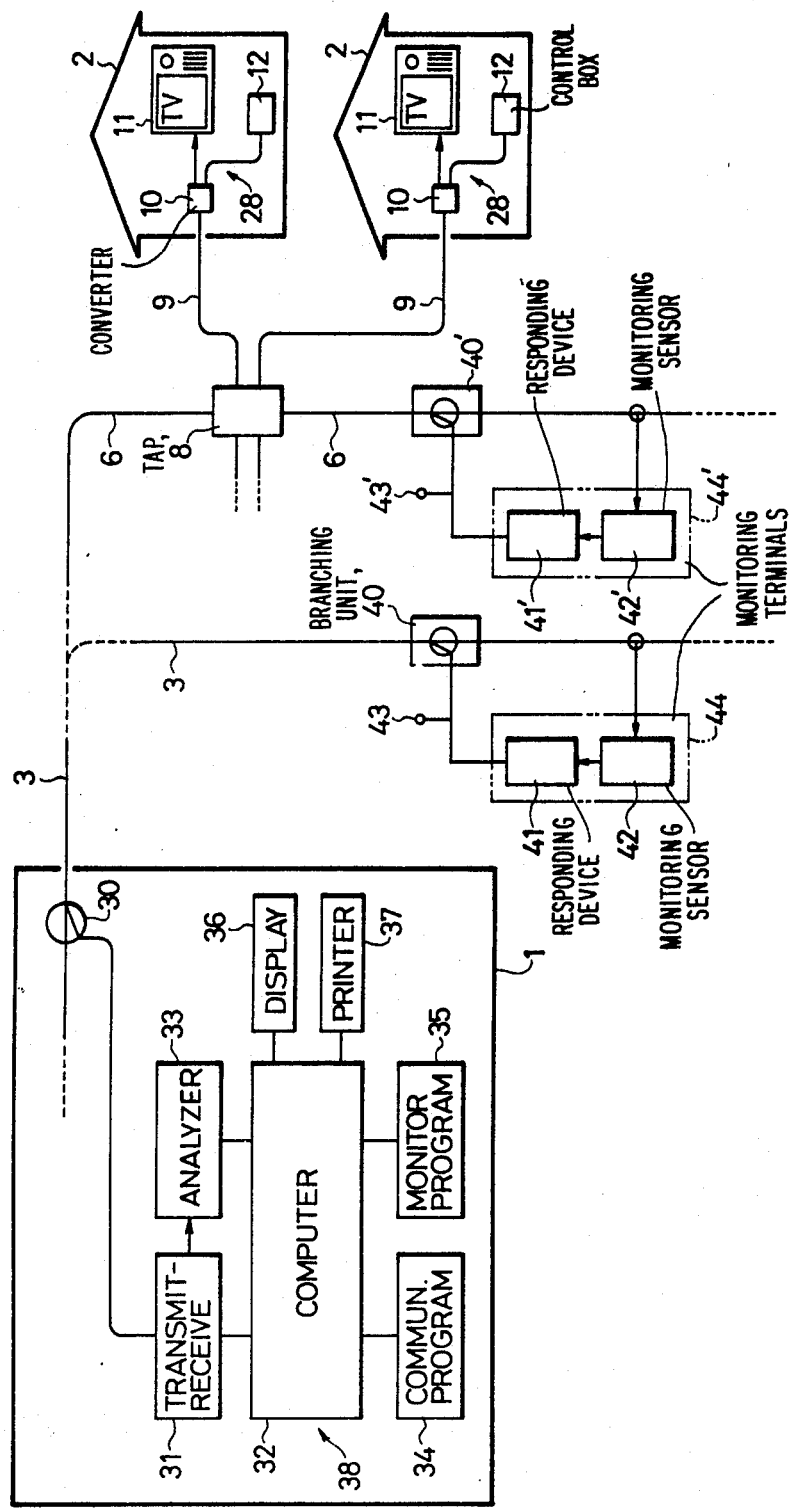
FIG. 2 is a block diagram showing an example of a CATV system constructed according to this invention.

A block diagram of a CATV system constructed in accordance with the present invention, as shown in FIG. 2, includes a center facility 1 including a branching unit 30 provided at one end of a main cable 3 in the center facility 1, a transnmitter-receiver 31 coupled to the branching unit 30, a computer 52 and an analyzing device 33 which are connected to the transmitter-receiver 31, a communicating program source 34 and a monitoring program source 35 provided for the computer 32, and a display unit 36 and a printer 37 coupled to the outputs of the computer 32. A central monitoring system 38 is constituted in the center facility 1 by the transmitter-receiver 31, the computer 32, the analyzing device 33, the communicating program 34, the monitoring program 35, the display unit 36 and the printer 37.

Branching units 40 are inserted in the main cable 3, which extends from the center facility 1, at various points. Responding devices 41, each of which has a unique identifying address, are connected to the branching units 40. Each responding device 41 is connected to a monitoring sensor 42 which is adapted to continuously detect the conditions of the main cable 3. The responding device 41 and the monitoring sensor 42 form a monitoring terminal unit 44. An inspection terminal 43 is connected between the branching unit 40 and the responding device 41.

Similar to the CATV system of FIG. 1, branch cables 6 extend from the main cable 3. Each branch cable 6 has branching units 40' at several points with each branching unit 40 connected to a monitoring terminal unit 44' including therein a responding device 41' and a monitoring sensor 42'.

The addresses of the responding devices 41 and 41' are selected to be different from those of the terminal units provided in subscriber's homes 2 so as to operate independently of the terminal units.

The operation of the CATV system thus constructed will be described. During normal operations, the monitoring sensors 42 and 42' operate to detect the conditions of the main cable 3 and of the branch cables 6, i.e. the gas pressures in the cables, the voltages applied to the monitoring terminal units 44 and 44', <u>the line signal</u> levels, the signal amplification factors and whatever other parameters are desired, with the detection results being stored in the answering devices 41 and 41'.

Collection of monitoring data by the center facility 1 can be carried out in two different modes. In one of the two modes, the center facility 1 calls the terminal units 28 by the use of the communicating program 34. In the other mode, the center facility 1 calls the monitoring terminals units 44 and 44' using the monitoring program 35.

The computer 32 reads the addresses of terminal units 28 according to the communicating program 34 and causes the transmitter-receiver 31 to call the terminal units 28 through the cables. The terminal units 28 thus called send answering signals through the cables to the transmitter-receiver 31. Then, the computer 32 receives the pre-stored data from the terminal units 28 in the form of answering signals.

Thereafter, the computer 32 reads the addresses of monitoring terminal units 44 and 44' using the monitoring program 35 and causes the transmitter-receiver 31 to transmit the addresses thus read and to call the responding devices 41 and 41' of the monitoring terminal units 44 and 44' corresponding to the addresses thus transmitted. The responding devices 41 and 41' thus called send the detection results which have been outputted by the monitoring sensors 42 and 42' and stored in the answering devices 41 and 41' simultaneously to the transmitter-receiver 31 through the main cable 3 and the branch cables 6. The detection results thus transmitted ("up" data) are applied from the transmitter-receiver 31 to the analyzing device 33 where the "up" data is analyzed. The analysis outputs of the analyzing device 33 are applied to the computer 32. The computer 32 assembles the addresses and the analysis outputs in a predetermined order and instructs the display unit 36 to display the results and, if desired, instructs the printer 37 to print out the assembled results.

The assembled results may be displayed and/or printed out for all of the monitoring terminal units 44 and 44'. However, the monitoring can be simplified by employing a technique by which only those monitoring terminal units 44 and 44' informing of abnormal conditions are selected and the addresses thereof and the abnormal conditions are displayed or printed out.

It is necessary to determine whether the monitoring terminal units 44 and 44' operate satisfactorily. For this purpose, the inspection terminals 43 and 43' described before are provided. That is, the monitoring terminal units can be individually inspected by connecting an inspecting unit to the inspection terminals 43 and 43'.

Figure 3:
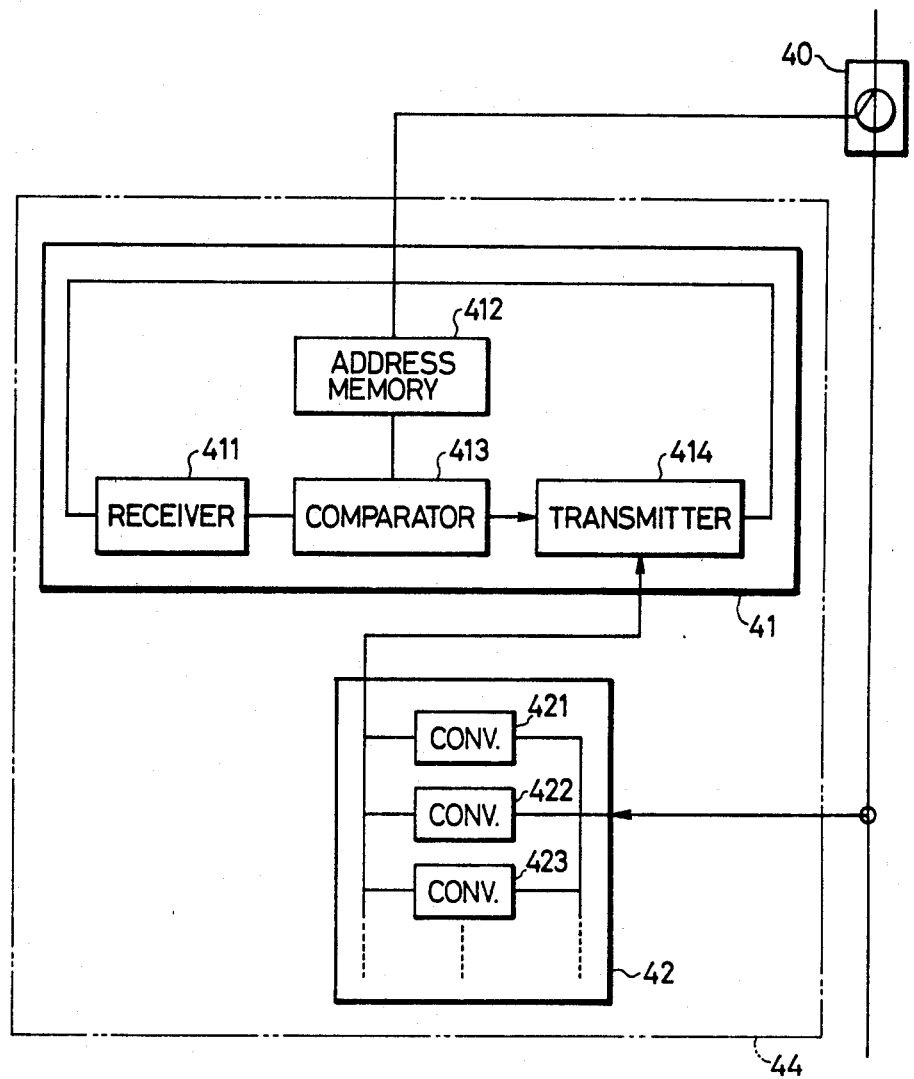
FIG. 3 is a block schematic diagram of a responding device and monitoring terminal unit used in the system of FIG. 2.

Referring to FIG. 3, when data signals from the center facility are received at a receiver section 411 within a responding device 41, the received data and a specific unique address stored in an address memory 412 are compared by a comparator 413. When the two are coincident, a transmitter 414 is actuated by an output comparison signal and hence data from the monitoring sensor 42 is transmitted back to the center facility at real time. The monitoring sensor 42 includes converters 421, 422, 423 etc., each of which converts a predetermined physical parameter into an electrical signal. For example, converter 421 may be a gas pressure/electrical signal converter, 422 a converter of power source voltage supplied to monitoring terminal unit 44, and 423 a signal amplification factor/voltage converter. Other types of converters may be used as desired depending upon the particular parameters it is desired to monitor. A memory unit (not shown) may be provided between the responding device 41 and the monitoring sensor 42 so that data from the monitoring sensor 42 is stored therein. When the transmitter 414 is actuated, data stored in the memory unit is transmitted back to the center facility.

With the CATV system of the invention organized as described above, it is unnecessary to transmit pilot signals continuously to monitor the lines for the abnormal conditions. That is, a plurality of monitoring terminal units can be called to answer by a polling operation, so that the lines can be monitored collectively. Thus, the points along the lines operating under abnormal conditions and the causes of the abnormal conditions can be detected early and accurately and the defects can accordingly be repaired quickly.

What is claimed is:

1. A remote line monitoring device for a CATV system in which a single center facility is connected to a plurality of terminal units through cables to transmit television signals through the cables to the terminal units comprising:
a plurality of monitoring units each having a unique identifying address for monitoring line conditions provided at predetermined points along said cables intermediate said center facility and said terminal units; and
a central monitoring system for transmitting and receiving data provided in said center facility;
said central monitoring system comprising means for calling said monitoring units with said individual addresses assigned thereto to cause said monitoring units to transmit data relating to line conditions to said central monitoring system, and means for receiving said data from said monitoring units.

2. A remote line monitoring device for a CATV system in which a single center facility is connected to a plurality of terminal units through cables to transmit television signals through the cables to the terminal units comprising: a plurality of monitoring units, each of said monitoring units being connected to said cables at a respective point thereof intermediate said center facility and said terminal units for providing said center unit with information about the condition of said cables at said respective points, each of said monitoring units comprising means for storing a unique address for identifying that monitoring unit, a receiver for receiving data transmitted through said cables, a comparator unit for comparing output data from said receiver with the output of said storing means, transmitter means for transmitting a signal supplied to a modulation input thereof in response to an output signal from said comparing means, and at least one converter unit for converting physical parameters to electrical signals, said electrical signals being coupled to said modulation input of said transmitter, said converter units monitoring physical parameters of said cables and said transmitter transmitting an output signal over said cables to said center facility; and a central monitoring system provided in said center facility for transmitting and receiving data to and from said monitoring terminal units.

3. In a CATV system of the type having a center facility and remote terminals for transmitting and receiving, respectively, TV and other information, the method of monitoring line conditions of cables connecting said remote terminals to said center facility, said method comprising the steps of:
sensing predetermined parameters at a plurality of points along said cables intermediate said center facility and said remote terminals;
converting said monitored physical parameters to electrical signals;
transmitting polling signals having unique addresses from said center facility via said cables; and
receiving said polling signals at said points along said cables and, in response to a polling signal having an address identifying said receiving location, transmitting said converted electrical signals to said center facility along said cables.

4. A remote line monitoring device as claimed in claim 1 wherein each said monitoring unit includes means for sensing the gas pressure in said cable.

5. A remote line monitoring device as claimed in claim 2 wherein said converter unit comprises means for monitoring the gas pressure in said cable.

6. The method of claim 3 wherein the step of sensing comprises sensing the gas pressure in said cable at said plurality of points.

* * * * *